(12) United States Patent
Tsang

(10) Patent No.: US 6,510,002 B1
(45) Date of Patent: Jan. 21, 2003

(54) APPARATUS FOR THREE-DIMENSIONAL DISPLAY

(75) Inventor: Peter Wai Ming Tsang, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 09/491,109

(22) Filed: Jan. 25, 2000

(51) Int. Cl.[7] .................. G02B 27/26; G02B 27/22; G09G 3/20
(52) U.S. Cl. .................. 359/465; 359/462; 348/57
(58) Field of Search ................. 359/465, 463, 359/478, 462, 464; 348/57, 42, 51, 54, 55, 58; 353/7, 8; 345/32, 33, 9; 342/176, 180

(56) References Cited

U.S. PATENT DOCUMENTS

| | | | | |
|---|---|---|---|---|
| 3,621,127 A | | 11/1971 | Hope | 348/56 |
| 3,737,567 A | | 6/1973 | Kratomi | 348/56 |
| 4,281,341 A | | 7/1981 | Byatt | 348/57 |
| 5,886,771 A | * | 3/1999 | Osgood | 359/478 |
| 5,993,004 A | * | 11/1999 | Moseley et al. | 359/464 |
| 6,252,624 B1 | * | 6/2001 | Yuasa et al. | 348/57 |

* cited by examiner

Primary Examiner—Mark A. Robinson
Assistant Examiner—Jennifer Winstedt
(74) Attorney, Agent, or Firm—Merchant & Gould P.C.

(57) ABSTRACT

This invention relates to apparatus for generating a three-dimensional display from a conventional television screen or computer monitor, and in particular to an adapter that may be placed in front of a television screen or computer monitor to enable three-dimensional images to be perceived by a viewer.

8 Claims, 12 Drawing Sheets

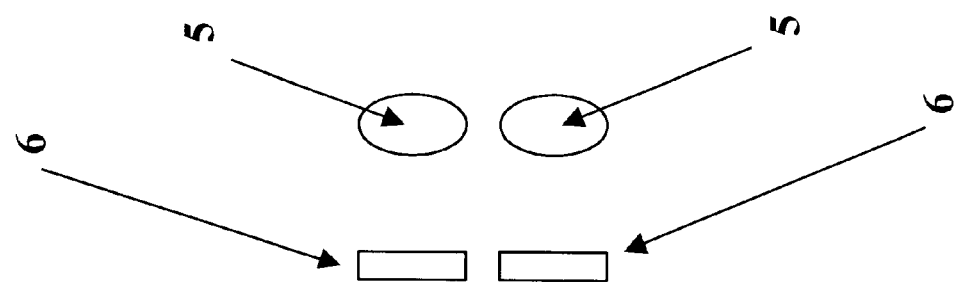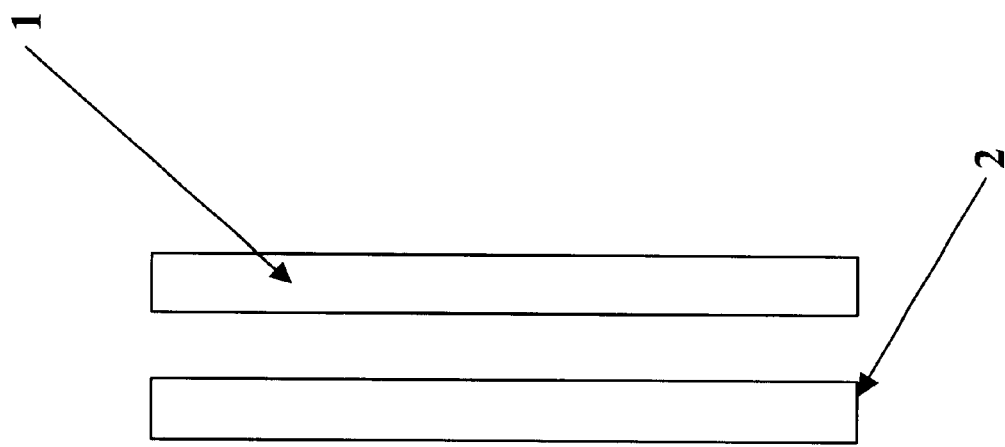
FIG. 2

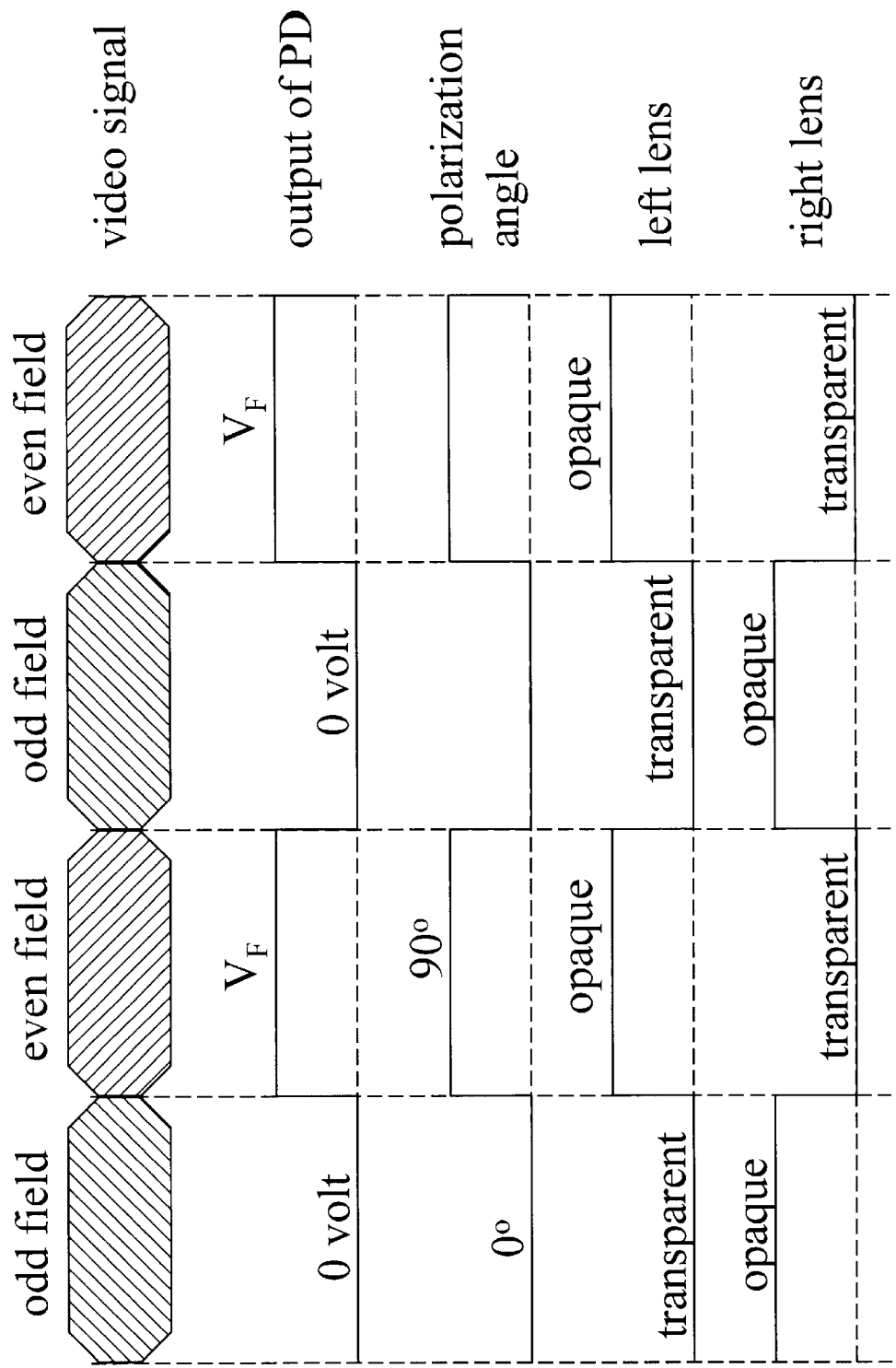
FIG. 10 Timing diagram in Stereoscopic display mode

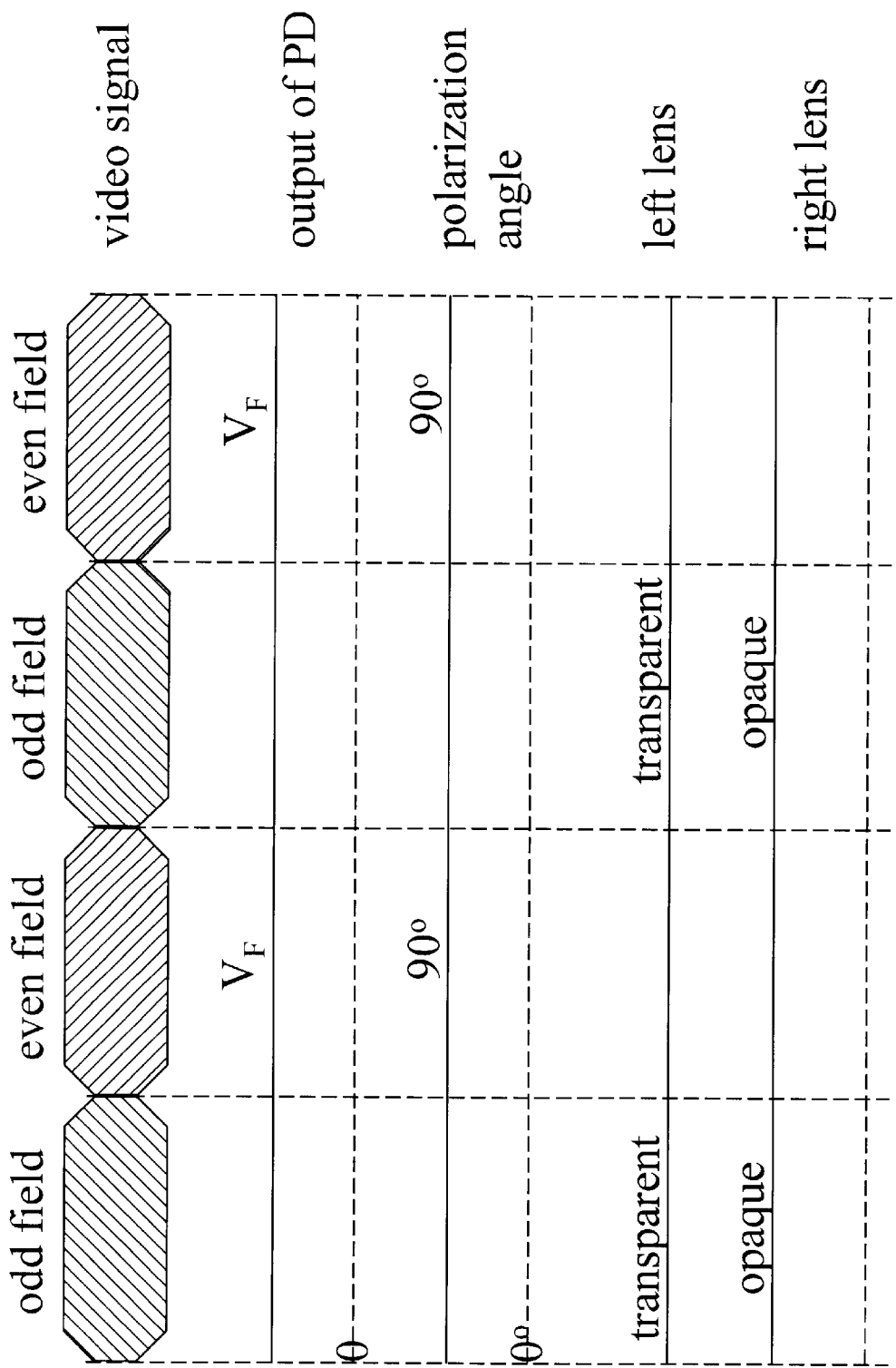
FIG. 11 Timing diagram in Pulfrich display mode

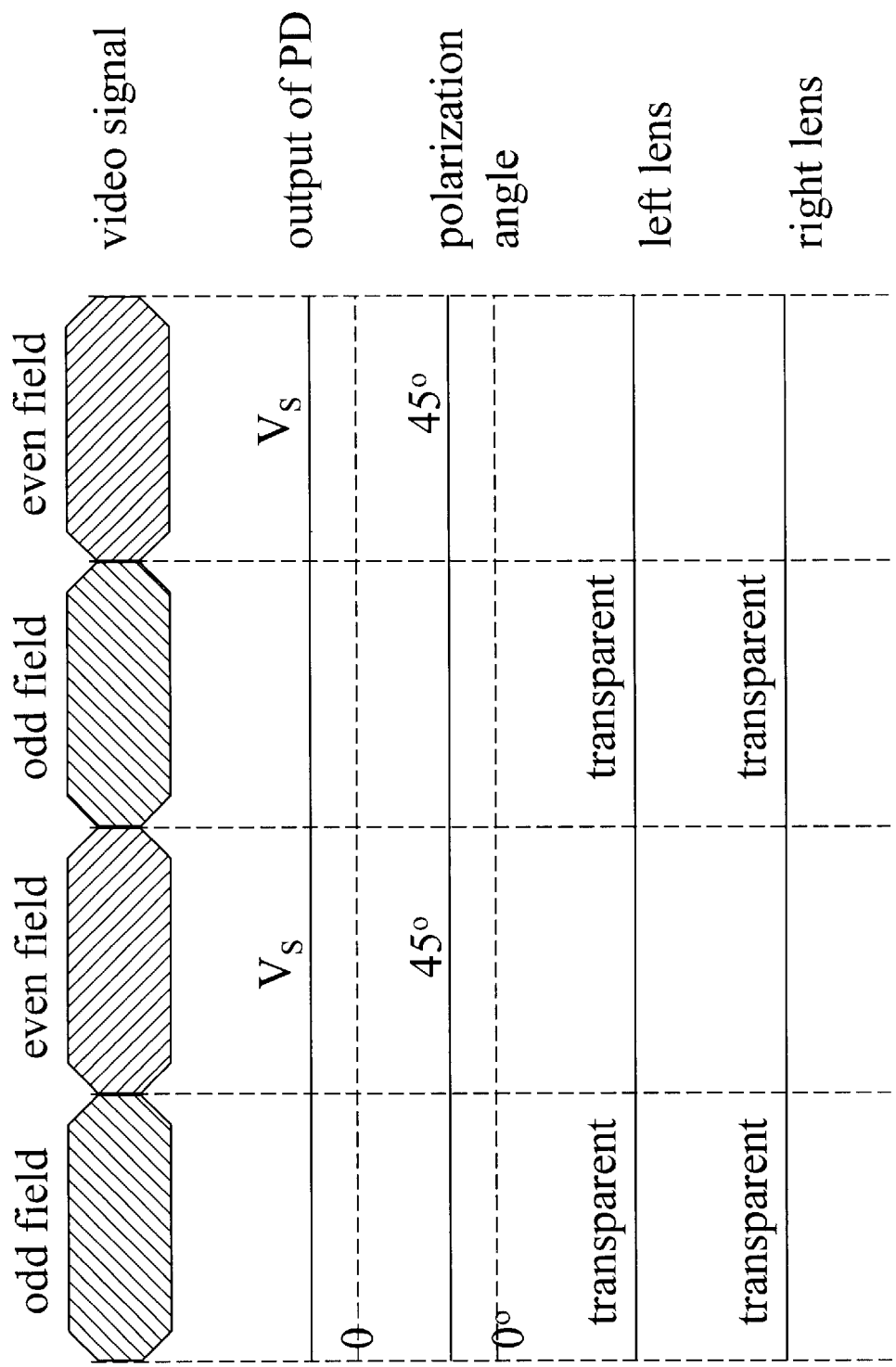
FIG. 12 Timing diagram in ordinary 2D display mode

APPARATUS FOR THREE-DIMENSIONAL DISPLAY

FIELD OF THE INVENTION

This invention relates to apparatus for generating a three-dimensional display from a conventional television screen or computer monitor, and in particular to an adapter that may be placed in front of a television screen or computer monitor to enable three-dimensional images to be perceived by a viewer.

BACKGROUND OF THE INVENTION

When a viewer looks at a scene, the left and right eyes will each receive a different left and right image. Corresponding points between the two images are locally displaced from each other by an amount commonly known as the disparity that is dependent on the distance between the point and the viewer. Based on this principle, stereoscopic three-dimensional images can be generated if it is possible to direct left and right images to the left and right eyes. By controlling the disparity between corresponding points a sense of depth can be created.

PRIOR ART

Developing a system that allows a two-dimensional screen, for example a television screen or a computer monitor, to display an image that may be perceived by a viewer as a three-dimensional image has been a long sought after goal and a number of prior proposals exist. A number of existing techniques and proposals are summarized as follows.

U.S. Pat. No. 3,737,567 and 3,621,127 disclose systems in which the left and right images are recorded in the odd and even (or vice versa) fields of an interlaced video signal. The viewer then wears spectacles consisting of two LCD shutters that are opened and closed in a complementary manner so that when the field containing the left image is displayed on the screen the left shutter is open and the other closed, while when the field containing the right image is displayed, the right shutter is open and the left is closed. This ensures that only the left eye sees the left image, and only the right eye sees the right image. The opening and closing of the two shutters is synchronized with the field repetition frequency.

U.S. Pat. No. 4,281,341 describes an alternative approach in which an onscreen modulator is applied to polarize video frame images into orthogonal phases. The left and right images are perceived by the left and right eyes respectively by the viewer wearing orthogonally polarised glasses.

These proposals ensure that the left and right eyes see only the left and right images respectively and thus allow three-dimensional images to be generated. However, in both these processes a device is needed to extract the field synchronization signal from the video signal and to control the LCD shutters or the onscreen modulator. The synchronization signal may be derived from the video signal, but in general terms the field synchronization signal is not externally available in a conventional television set. Furthermore, where LCD shutters are used, a circuit is required in the viewer's spectacles to control the on/off action of the LCD shutters. These technical requirements reduce the practicality of these approaches.

Another approach to providing a three-dimensional effect is to impose three-dimensional perception on the human visual system using the Pulfrich effect. In methods based on this approach, the left and right eyes view the screen through two light filters of a considerable difference in opaqueness.

SUMMARY OF THE INVENTION

An apparatus for generating a three-dimensional image in accordance with the principles of the present invention includes polarization means adapted to be placed in front of a screen for displaying images, and means for controlling the polarization of said polarization means in accordance with the nature of the images displayed on said screen.

The polarization means may be a liquid crystal polarizer having a polarization angle that depends on an applied voltage.

The control means may include a control region of the screen.

The apparatus may include a light sensitive means that is adapted to face the control region, the control region being adapted to produce differing light patterns. The light sensitive means may generate an output control signal that controls the voltage applied to said liquid crystal polarizer.

The apparatus may further include spectacles for viewing the image output, the spectacles having left and right lenses that are orthogonally polarized.

The apparatus may be capable of generating stereoscopic three-dimensional images and Pulfrich three-dimensional images.

A method for generating three-dimensional images from a two-dimensional screen in accordance with the principles of the present invention includes the steps of: displaying a two-dimensional image on a screen, passing the image through a polarizer, and viewing the polarized image through a pair of spectacles having orthogonally polarized lenses.

The polarization angle of the polarizer may be variable depending on the type of three-dimensional image to be generated. The polarization angle of the polarizer may be varied by a control region forming, part of the two-dimensional image. The polarizer may be a liquid crystal polarizer, so that the polarization angle is varied by varying an applied voltage.

The control region may include an illumination pattern wherein the applied voltage is varied by means of a control signal generated by a light sensitive element that senses the illumination pattern.

The two-dimensional image may have a plurality of sequential frames, the frames being alternately left and right images, wherein the polarization angle of the polarizer is varied in synchrony with the alternating images. The left and right images may be differently polarized such that the left images can be viewed only through the left lens of the viewing spectacles, and the right images can bep viewed only through the right lens of the viewing spectacles so as to generate a stereoscopic three-dimensional image.

The two-dimensional image may have a plurality of odd and even fields, the polarization angle being held constant in both the odd and even fields. The image may polarized such that the light intensity viewed through one of the lenses is greater than the light intensity viewed through another of lenses, so as to generate a Pulfrich phenomenon.

The two-dimensional image may have a plurality of odd and even fields, the polarization angle being held constant in both the odd and even fields. The image may be polarized such that the light intensity viewed through one of the lenses is the same as the light intensity viewed through another of the lenses, so as to generate a conventional two-dimensional image.

BRIEF DESCRIPTION OF THE DRAWINGS

Some embodiments of the invention will now be described by way of example and with reference to the accompanying drawings, in which:

FIG. 2 illustrates schematically the position of the adapter of the present invention in relation to the screened a viewer, FIG. 10 is a timing diagram for stereoscopic display mode, FIG. 11 is a timing diagram for Pulfrich display mode, and FIG. 12 is a timing diagram for ordinary two-dimensional display.

DETAILED DESCRIPTION OF PREFERRED EMBODIMENTS

Figure 1:
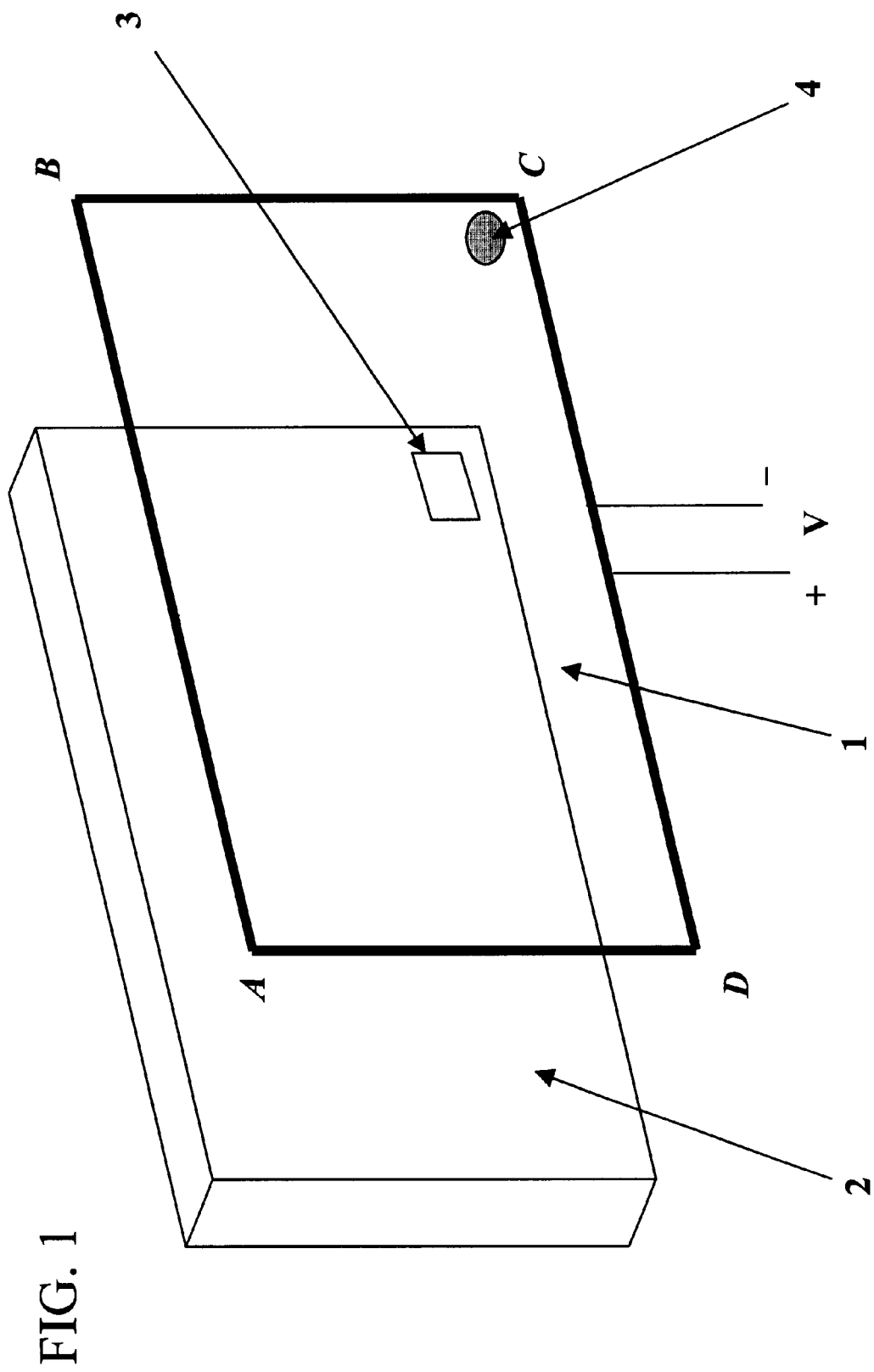
FIG. 1 is a schematic perspective view of an embodiment of the invention.

Referring firstly to FIG. 1 there is shown an embodiment of the present invention in the form of an adapter which comprises a liquid crystal polarizer 1 that is adapted to be positioned in front of a cathode ray tube display screen 2 of a television or computer monitor. A region 3 of the screen 2, preferably in a corner of the screen so as not to interfere with the displayed image, is set aside as a control region while the polarizer 1 includes a phototransistor 4 in a corner thereof positioned so that when the polarizer is placed in front of the screen 2 the phototransistor is positioned adjacent the control region 3.

Figure 9:
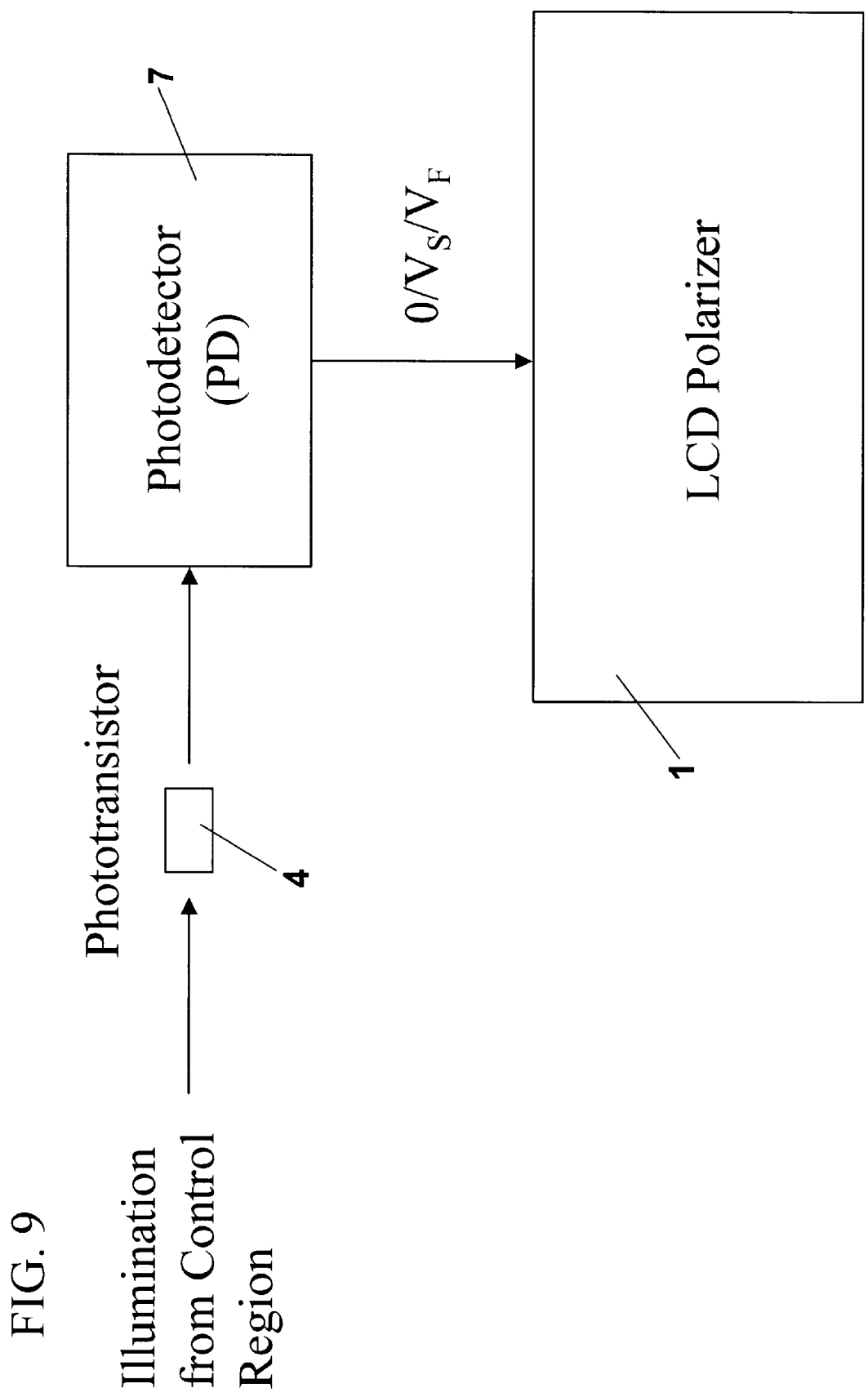
FIG. 9 is a block diagram of a control system of an embodiment of the invention.

The polarizer 1 polarizes the images emitted from the display 2 to 0, 45 or 90 when a voltage of 0, $V_S$ or $V_F$ respectively is applied, and a viewer's eyes 5 view the image emitted from the polarizer through a pair of spectacles 6 (FIG. 2) of which the left and right lenses are polarized with 0 and 90 respectively. As will be described in more detail below, the function of the control region 3 and the phototransistor 4 is to generate a control signal which controls the voltage applied to the polarizer 1 and thus the polarization of the images emitted from the polarizer 1. As is shown in FIG. 9, the output from the phototransistor passes to a photodetector 7 which in response to the input control signal generates a voltage 0, $V_S$ or $V_F$ which is applied to the polarizer 1. As will be explained below, depending on the nature of this control signal and thus the applied voltage, the polarizer 1 may enable a viewer to see stereoscopic three-dimensional images, three-dimensional images using the Pulfrich phenomenon, or conventional two-dimensional images. will be explained below, depending on the nature of this control signal and thus the applied voltage, the polarizer 1 may enable a viewer to see stereoscopic three-dimensional images, three-dimensional images using the Pulfrich phenomenon, or conventional two-dimensional images.

Figure 3:
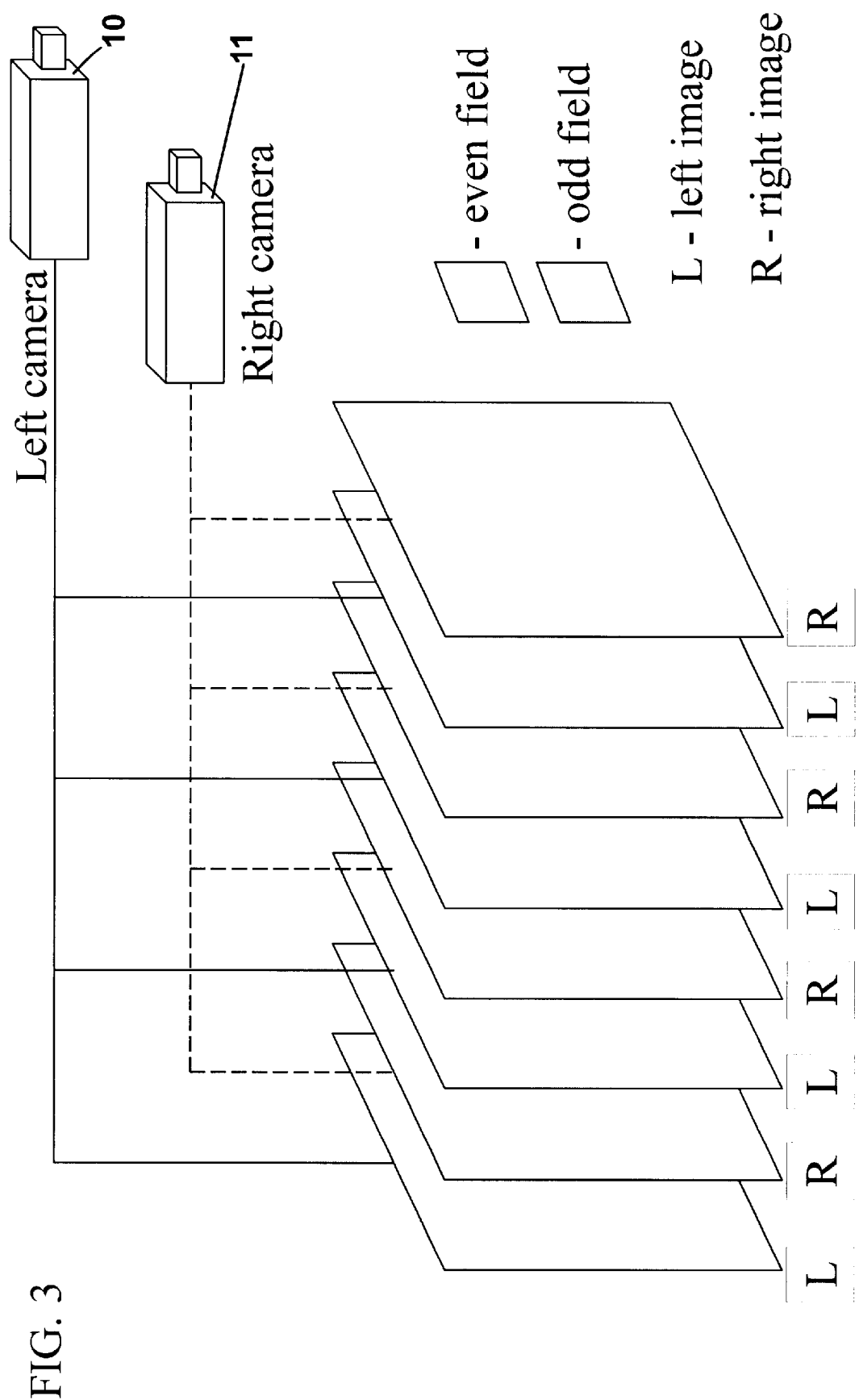
FIG. 3 shows a possible organization of left and right images in even and odd video fields from two video sources.
Figure 4:
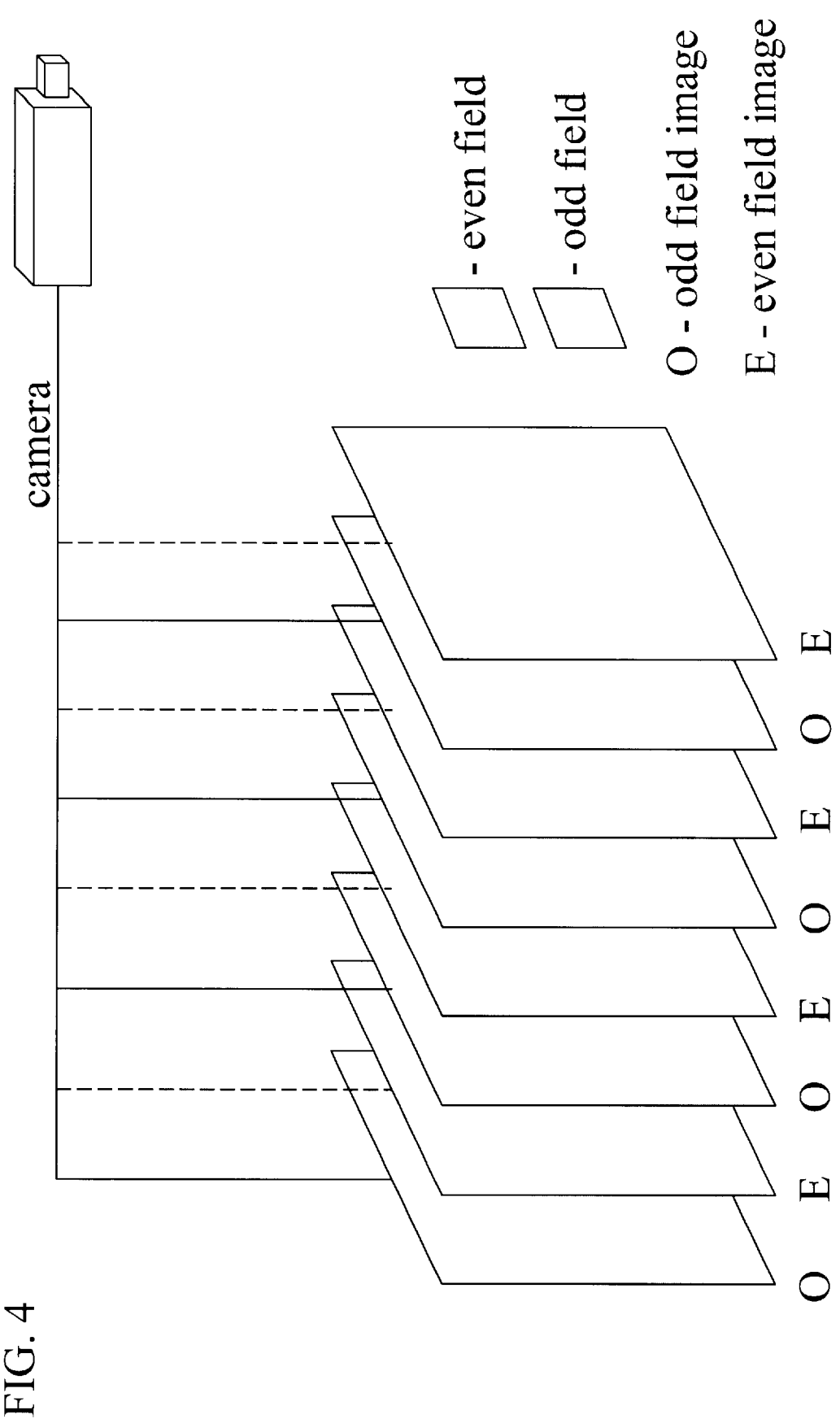
FIG. 4 shows a possible organization of left and right images in even and odd video fields from a single video source.
Figure 5:
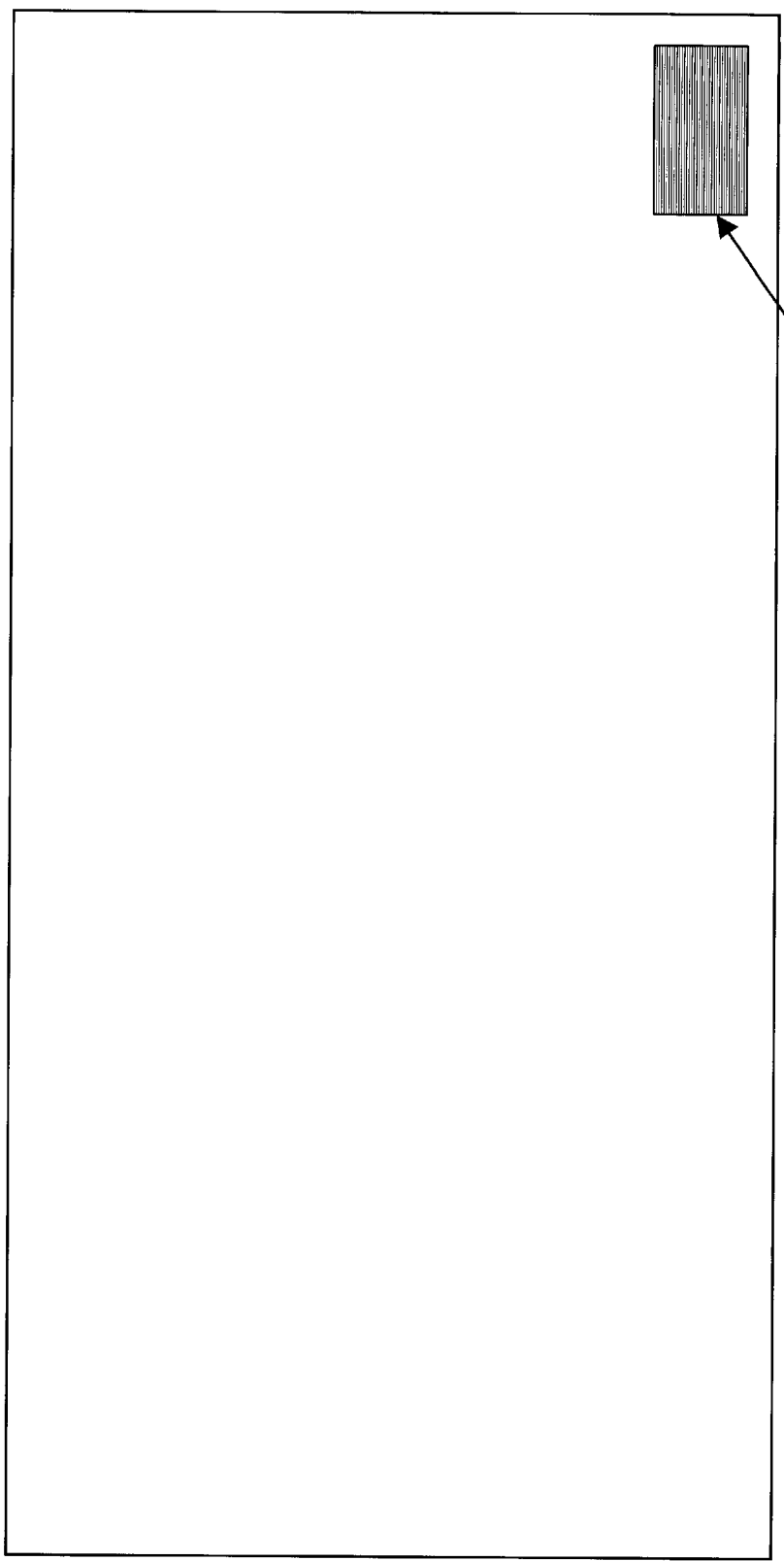
FIG. 5 shows the control region of the present invention.

FIG. 3 shows schematically how the left and right images are organized in the video fields for stereoscopic three-dimensional images. Two cameras 10, 11 are provided for left and right images respectively, and the left images occupy the odd fields and the right images occupy the even fields. For a viewer to see stereoscopic three-dimensional images, the left eye must see only the left images (i.e. the odd fields) and the right eye must see only the right images (i.e. the even fields). This may be achieved by alternately switching the polarization of the polarizer 1 between 0° and 90° in synchronization with the odd and even fields such that when the display 2 shows an odd field the polarization of the polarizer 1 is 0° and the image can only be seen by the left eye through the 0° polarised lens of the spectacles. Similarly when the display shows an even field the polarization of the polarizer 1 must be 90° so that the image can only be seen by the right eye through the right 90° polarized lens of the spectacles. This requirement means that the voltage applied to the polarizer 1 must switch between 0 and $V_F$ as the display alternates between odd and even fields.

Figure 6:
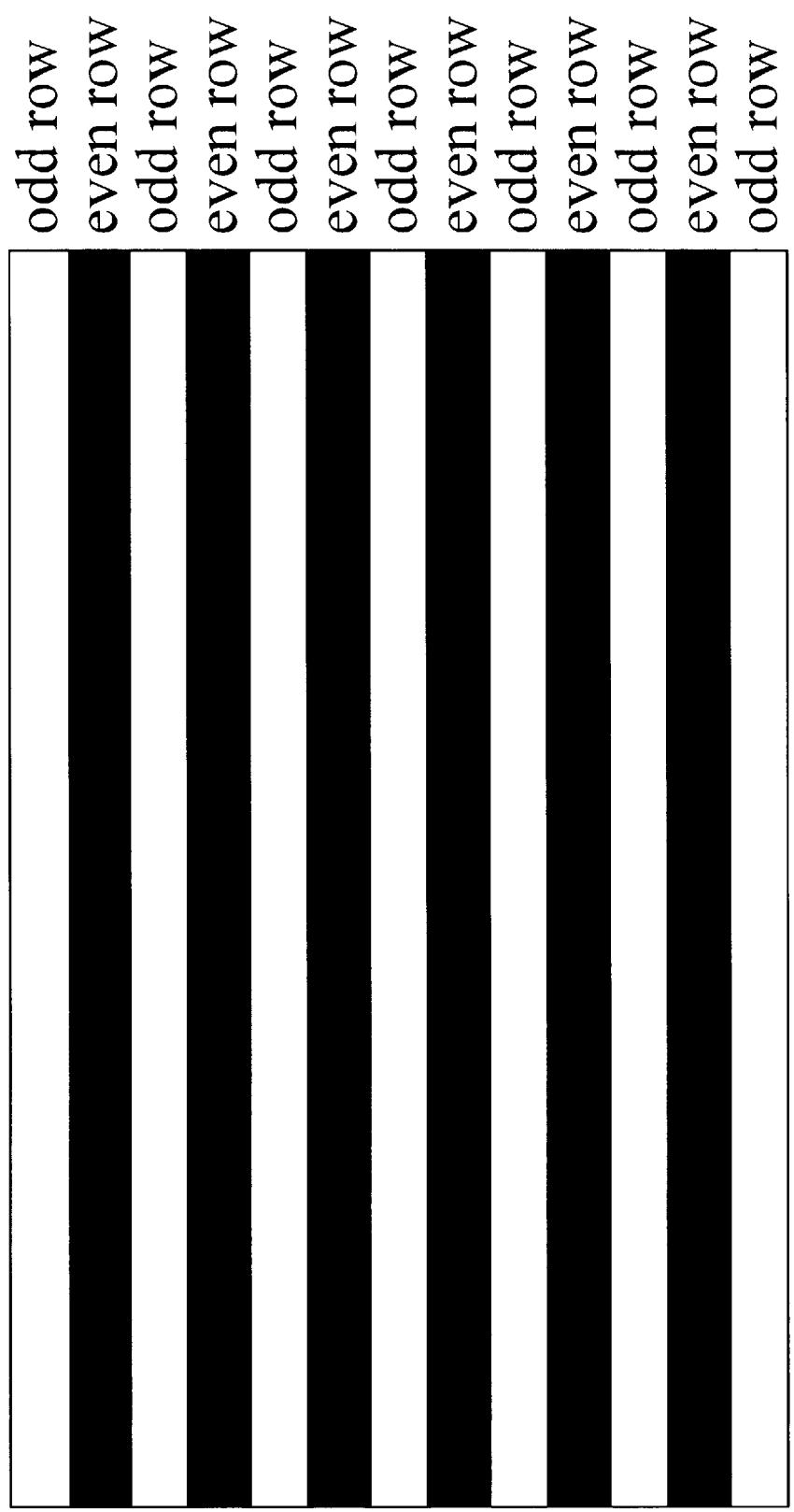
FIG. 6 shows the control region pattern for stereoscopic three-dimensional video.

This requirement is achieved by the control region having a pattern of odd horizontal bars as shown in FIG. 6 which should be considered in conjunction with the timing diagram of FIG. 10. During the odd fields, the left image is displayed on the screen 2. In the odd fields, the control region displays white horizontal bars and they drive the output of the photodetector to zero. This means that the polarization angle is also zero and thus the left lens is transparent and the right lens opaque. Thus only the left eye can see the image, which is correct, as it is the left image that is being displayed. Conversely during the even fields the right image is shown. In the even fields the control region displays the dark horizontal bars and drives the photodetector voltage to $V_F$. The polarization angle is then set at 90 and the right lens is transparent and the left lens is opaque. Thus only the right eye sees the right images.

If the video source carries a normal two dimensional image sequence with each frame containing a single full picture, then there are two possible ways that the image can be viewed: either as a three-dimensional image using the Pulfrich phenomenon or as a conventional two dimensional image. The choice is made by the control region.

Figure 7:
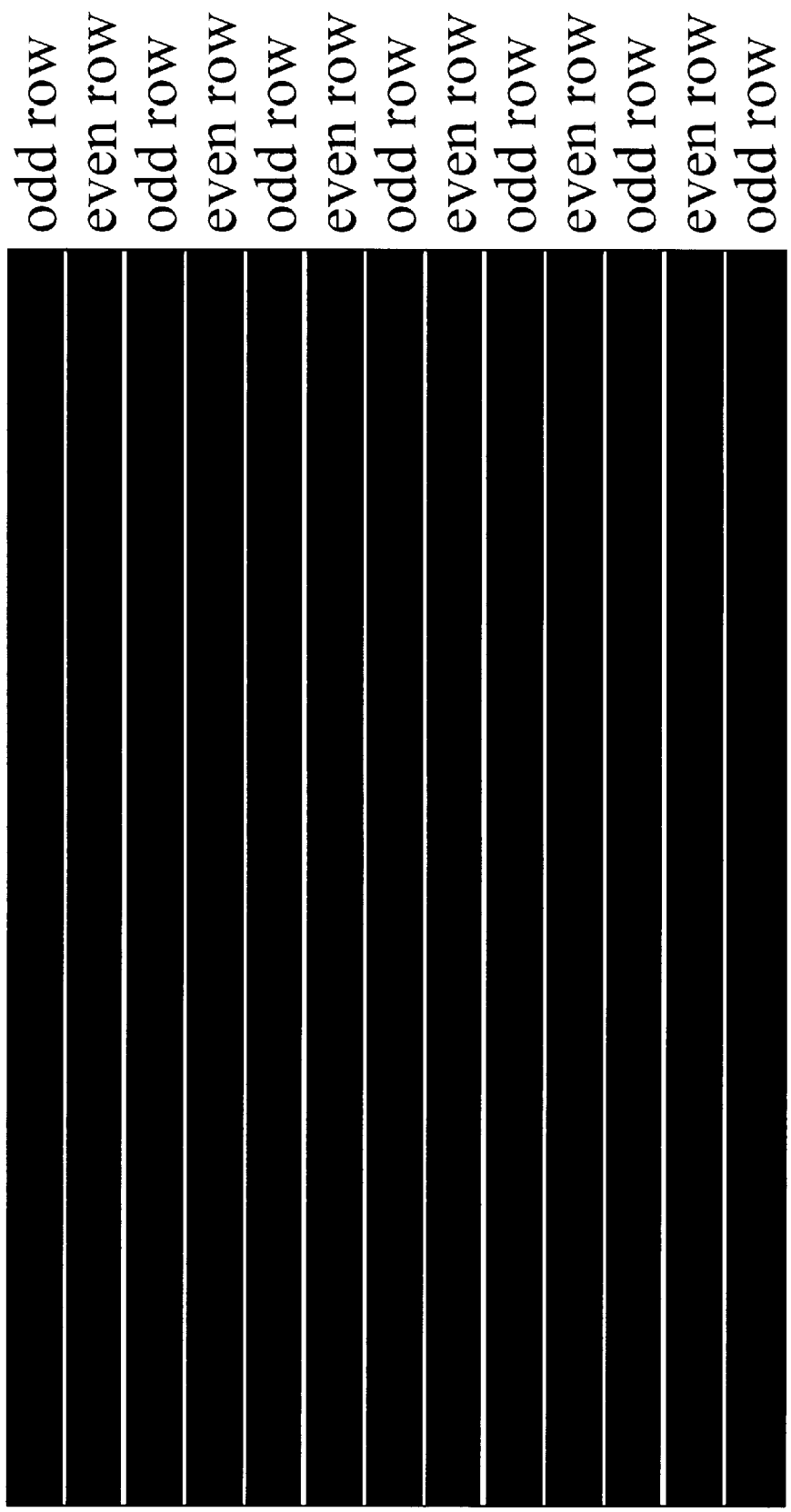
FIG. 7 shows the control region pattern for Pulfrich three-dimensional video.

To obtain a Pulfrich three-dimensional image the control region is set to be permanently blacked out as shown in FIG. 7 with the timings as shown in FIG. 1. The output of the photodetector is fixed at $V_F$, which in turn fixes the polarization angle at 90°. This means that the left lens is opaque and the right lens is transparent. As a consequence there is the imbalance in light intensity between the two eyes for the Pulfrich phenomenon to come into effect.

Figure 8:
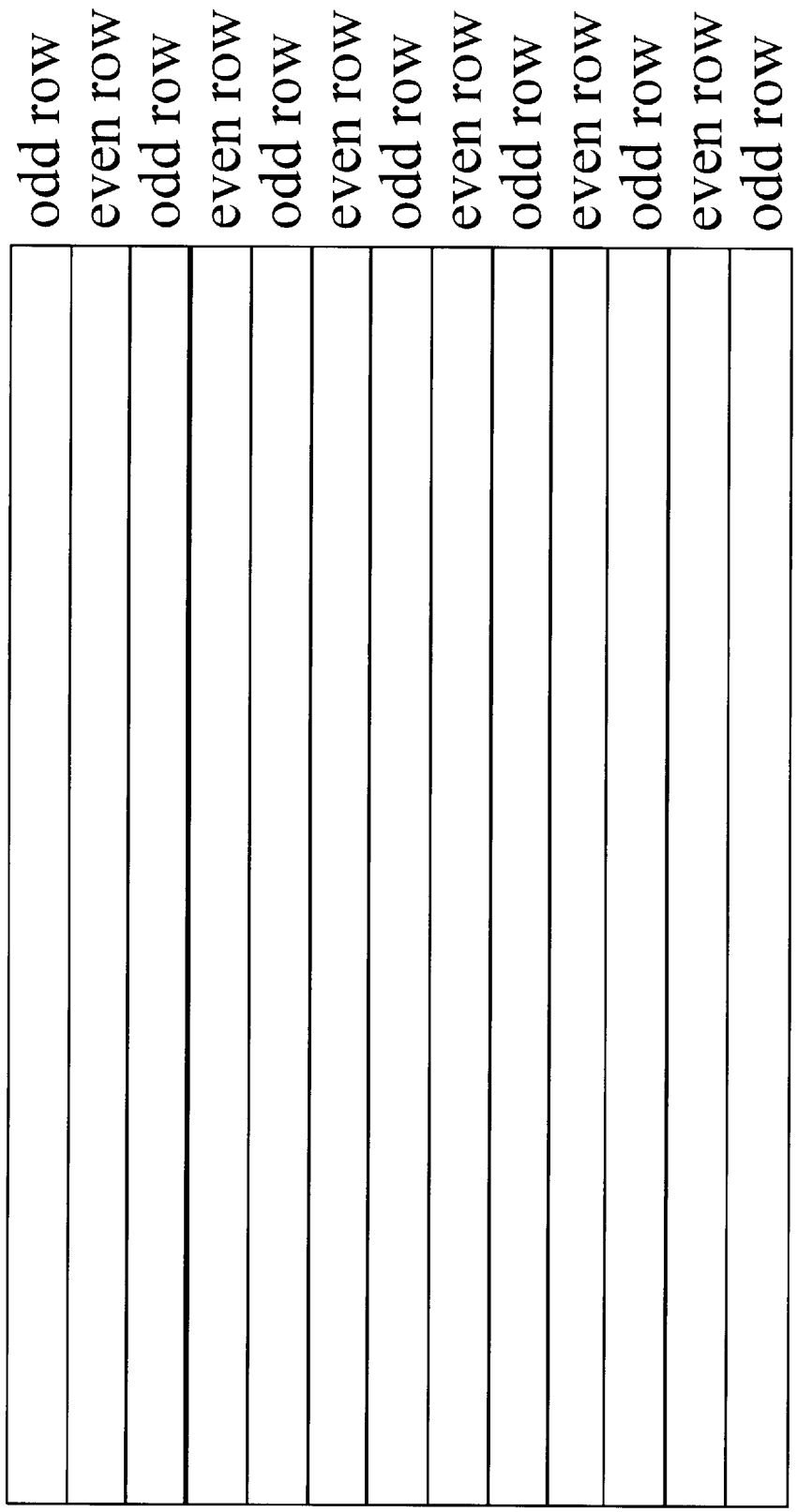
FIG. 8 shows the control region pattern for ordinary two-dimensional video.

Normal two-dimensional images can be viewed by filling the control region with white lines as shown in FIG. 8. As is explained by the timing diagram in FIG. 12, this fixed the photodetector output voltage at $V_s$ and thus the polarization angle at 45°. Thus both left and right lenses are equally transparent (though not completely transparent) and a conventional two-dimensional image can be viewed.

It will be appreciated that the above described system allows a conventional television screen or computer monitor to display a three-dimensional image (either a stereoscopic three-dimensional image or a Pulfrich three-dimensional image) simply by placing the adapter in front of the screen. No modification is required to the television or computer screen and no electrical connection to the television or computer is required. All that is necessary is for the video signal to include a control signal, which acts to generate the required illumination in the control region. In turn this sets the polarization of the adapter in automatic synchronization with the image.

What is claimed is:

1. Apparatus for generating a display, comprising:
   polarization means adapted to be placed in front of a screen for displaying images;
   spectacles for viewing said images from said polarizing means, said spectacles having left and right lenses that are orthogonally polarized; and
   control means for controlling the polarization of said polarization means in accordance with the nature of the images displayed on said screen;
   said control means being adapted to control said polarization means in first, second, and third modes, wherein;
   in said first mode, said images comprise alternating left and right fields that are polarized alternately to 0 and 90 to generate a stereoscopic image;
   in said second mode, said images are polarized to 90 to generate a Pulfrich image; and
   in said third mode, said images are polarized to 45 to generate a two-dimensional image.

2. Apparatus as claimed in claim 1 wherein said polarization means is a liquid crystal polarizer having a polarization angle that depends on an applied voltage.

3. Apparatus as claimed in claim 2 wherein said control means comprises a control region of said screen.

4. Apparatus as claimed in claim 3 wherein said apparatus comprises a light sensitive means that is adapted to face said control region, and wherein said control region is adapted to produce differing light patterns.

5. Apparatus as claimed in claim 4 wherein said light sensitive means generates an output control signal that controls the voltage applied to said liquid crystal polarizer.

6. A method for generating images from a two-dimensional screen comprising the steps of:
   displaying a two-dimensional image on said screen;
   passing said image through a polarizer;
   forming a control region on a part of said image;
   controlling a polarization angle of said image with said control region so as to adjust said images between a first, second, and third mode, wherein;
   in said first mode, wherein said images comprise alternating left and right fields, polarizing said images Ialternately to 0 and 90 to generate a stereoscopic image;
   in said second mode, polarizing said images to 90 to generate a Pulfrich image;
   in said third mode, polarizing said images to 45 to generate a two-dimensional image; and
   viewing said polarized image through a pair of spectacles having orthogonally polarized lenses.

7. A method as claimed in claim 6 wherein said polarizer is a liquid crystal polarizer and said polarization angle is varied by varying an applied voltage.

8. A method as claimed in claim 6 wherein said control region comprises an illumination pattern and wherein said applied voltage is varied by means of a control signal generated by a light sensitive element that senses said illumination pattern.

* * * * *